(12) United States Patent
Kondo

(10) Patent No.: US 7,471,240 B2
(45) Date of Patent: Dec. 30, 2008

(54) ANTENNA CONNECTION DETECTING DEVICE AND VEHICLE NAVIGATION DEVICE

(75) Inventor: Akira Kondo, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 412 days.

(21) Appl. No.: 11/443,450

(22) Filed: May 31, 2006

(65) Prior Publication Data

US 2006/0273956 A1    Dec. 7, 2006

(30) Foreign Application Priority Data

Jun. 1, 2005  (JP) ............................. 2005-161288
Oct. 20, 2005  (JP) ............................. 2005-305800
Apr. 10, 2006  (JP) ............................. 2006-107606

(51) Int. Cl.
    *G01S 7/185* (2006.01)
(52) U.S. Cl. .................. 342/357.06; 342/423; 342/463; 342/465; 340/540; 340/908; 340/980
(58) Field of Classification Search ................ 340/540, 340/572.7, 825.69, 908, 980; 342/357.06, 342/175, 176, 177, 385, 423, 463, 465; 343/713, 343/878, 702, 846, 850–876; 345/7, 269; 455/3.01, 3.02; 324/523, 501, 521, 527, 324/529
See application file for complete search history.

(56) References Cited

U.S. PATENT DOCUMENTS 6,011,518 A * 1/2000 Yamagishi et al. .......... 343/713
6,437,577 B1 * 8/2002 Fritzmann et al. ........... 324/523

FOREIGN PATENT DOCUMENTS

JP    A-2000-132793    5/2000
JP    A-2003-234705    8/2003

* cited by examiner

*Primary Examiner*—Sisay Yacob
(74) *Attorney, Agent, or Firm*—Posz Law Group, PLC

(57) ABSTRACT

A current flowing from a circuit section into an integrated antenna flows through a coil. When a pseudo up-link signal is outputted from a VICS (light) signal processing circuit to check a connection state of an integrated antenna, since a large current flows through a transmitting element for optical beacons of the integrated antenna, a drop voltage of the coil becomes large. When the drop voltage of the coil is within a prescribed range because of divided voltages of resistors, the antenna detection circuit determines that the integrated antenna is normal. In this case, since a large current flows into the coil, a coil having small impedance is used.

13 Claims, 6 Drawing Sheets

ANTENNA CONNECTION DETECTING DEVICE AND VEHICLE NAVIGATION DEVICE

CROSS REFERENCE TO RELATED APPLICATION

This application is based on and incorporates herein by reference Japanese Patent Applications No. 2005-161288 filed on Jun. 1, 2005, No. 2005-305800 filed on Oct. 20, 2005 and No. 2006-107606 filed on Apr. 10, 2006.

FIELD OF THE INVENTION

The present invention relates to a device for detecting a connection state of an antenna and a vehicle navigation device, the antenna including transmitting and receiving elements for communication with a vehicle outside.

BACKGROUND OF THE INVENTION

Some vehicle navigation devices have an integrated antenna, in which a GPS (Global Positioning System) antenna and an antenna for radio beacons of VICS (Vehicle Information and Communication System) are integrated. In the vehicle navigation device having such an integrated antenna, the integrated antenna and a circuit section are connected with each other by a cable. The circuit section is provided with a resistor through which an electric current flows into the integrated antenna to which power is being supplied. By detecting a drop voltage generated in the resistor because of the current flowing through a low noise amplifier (LNA), a connection state (open, normal or short) of the integrated antenna is detected.

However, with such a construction, in which the current flowing into the low noise amplifier of the integrated antenna is detected, depending on a circuit constant, the amount of current flowing through the resistor for detecting the current may be too small to detect the drop voltage of the resistor. In this case, to obtain a large drop voltage by the resistor for detecting the current, the resistance value must be set large.

In the case where the integrated antenna is provided with a transmitting/receiving element for the optical beacons, when an optical up-link signal is outputted to the integrated antenna, a large current flows thorough the transmitting/receiving element. As a result, a current larger than usual flows through the resistor for detecting the current. Therefore, when the resistance value of the resistor is large, the resistor is likely to be burned out by the large current flowing into the transmitting element for optical beacons when the up-link signal is transmitted. Moreover, the transmitting/receiving of optical beacons may be disabled because of noise.

In JP 2003-234705A, for example, the operation of optical beacons is diagnosed by switching circuits to send a transmission signal for diagnosis to a received signal processing circuit during diagnosis. In JP 2000-132793A, communication operation is confirmed by placing a reflector in front of the optical beacon and reflecting transmitting light of the optical beacon to input it to a receiving circuit. However, this does not solve the above drawback.

SUMMARY OF THE INVENTION

An object of the present invention is to provide a device for detecting a connection state of an antenna that enables accurate detection of a connection state with low resistance values of a resistor for detecting current, and is free of the influence of the invasion of noises, and a vehicle navigation device.

According to one aspect, when power is fed to an antenna, a current flows into the antenna, and at the same time flows into a resistor circuit for detecting current. As a result, a voltage drop occurs in a resistor. To determine a connection state of the antenna, an inspection signal outputting circuit transmits an inspection signal to a transmitting element for optical beacons. When the antenna is connected, a large current flows into the transmitting element for optical beacons. Thus, a large current flows through the resistor, a sufficiently large drop voltage is produced in the resistor even when a resistance value of the resistor is set relatively small. Therefore, a connection state of the antennal can be determined based on a drop voltage of the resistor.

According to another aspect, a pseudo up-link signal is applied to an antenna to detect a connection state of the antenna based on a difference in voltages developed in a resistor circuit through which an electric power is applied to the antenna. When an abnormal connection state is detected, an interval of the pseudo up-link signal is shortened so that the connection state is detected more frequently than in a normal connection state.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
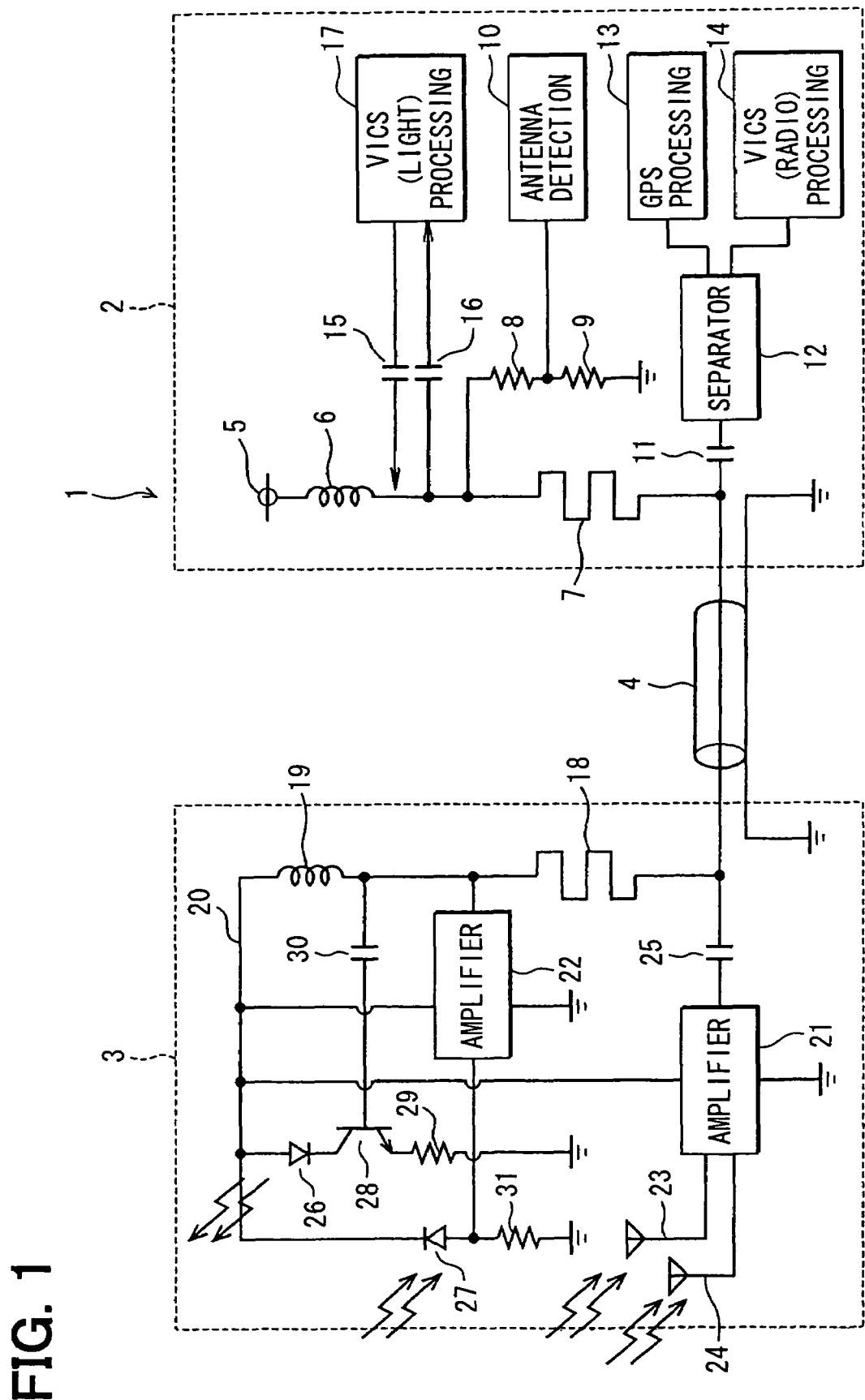
FIG. 1 is an electrical circuit diagram showing a first embodiment of a vehicle navigation device.

Referring to FIG. 1, a vehicle navigation device 1 is constructed with a circuit section 2 and an integrated antenna 3, which are connected with each other through a coaxial cable 4. In the circuit section 2, a coil (inductive resistor) 6 and a non-inductive resistor 7 are connected in series between a power supply line 5 and one end of the coaxial cable 4. A first resistor 8 and a second resistor 9 for dividing an applied voltage are connected in series between a common junction of the coil 6 and the non-inductive resistor 7 and a 0V line (ground). An antenna detection circuit 10 is connected to the common junction of the first resistor 8 and the second resistor 9. The antenna detection circuit 10 inputs the voltage divided by the first resistor 8 and the second resistor 9 from an AD port functioning as a connection confirmation port, and detects a connection state of the integrated antenna 3 based on the inputted voltage.

A separator 12 is connected to one end of the coaxial cable 4 via a capacitor 11. The separator 12, which separates a GPS signal and a VICS signal that are inputted through the coaxial cable 4 from the integrated antenna 3, respectively outputs the separated signals to a GPS processing circuit 13 and a VICS (radio) processing circuit 14. By VICS (radio), information about an expressway about 200 km forward of a traveling direction of a vehicle, and information about connected roads near an interchange and regular roads running in parallel are provided from the beacon. The contents of the information may include traffic congestion, link travel time of an expressway, regulations, information about service areas and parking areas, trouble information and travel time between interchanges.

To the common junction of the coil 6 and the non-inductive resistor 7, an output part and an input part of a VICS (light) processing circuit (an inspection signal outputting circuit) 17 are connected via capacitors 15 and 16. The VICS (light) processing circuit 17 acquires VICS information from on-road apparatuses (not shown) through the integrated antenna 3 by an optical signal. By the VICS (light) signal, information about regular roads and an expressway 30 km forward of and 1 km backward of a traveling direction from an optical beacon is offered. The contents of the information include traffic congestion, link travel time, regulations, parking area information and section travel time.

The above antenna detection circuit 10, the GPS signal processing circuit 13, the VICS (light) processing circuit 17, and the VICS (radio) processing circuit 14, which are actually constructed as parts of functions of a control device, may be constructed by hardware or software.

On the other hand, in the integrated antenna 3, a power supply line 20 is connected to the other end of the coaxial cable 4 via a non-inductive resistor 18 and a coil (inductive resistor) 19. Power is fed to low noise amplifiers 21 and 22 through the power supply line 20.

The integrated antenna 3 includes a GPS antenna 23 and a VICS antenna 24, and signals received by them are outputted to the amplifier 21. The amplifier 21 outputs a signal received by the GPS antenna 23 and the VICS antenna 24 to the circuit section 2 through a capacitor 25 and the coaxial cable 4. The amplifier 21 also serves as a circuit for coupling signals.

In addition to the GPS antenna 23 and the VICS antenna 24, the integrated antenna 3 includes a transmitting element 26 for optical beacons and a receiving element 27 for optical beacons. The transmitting element 26 is connected with the power supply line 20, and the cathode is connected with the 0V line via a driving transistor 28 and a resistor 29. The base of the transistor 28 is connected with a common junction of the coil 19 and the non-inductive resistor 18 via a capacitor 30.

The cathode of the receiving element 27 is connected with the power supply line 20, the anode is connected with the 0V line via a resistor 31, and a common junction of the anode and the resistor 31 is connected with the amplifier 22. The amplifier 22 amplifies a down-link signal from an on-road apparatus received by the receiving element 27, and outputs it to the circuit section 2 through the non-inductive resistor 18 and the coaxial cable 4.

Current flowing through the integrated antenna 3 flows through the coil 6 provided in the circuit section 2, and a drop voltage of the coil 6, that is, voltage across the coil 6, corresponding to the current is detected by the antenna detection circuit 10. In this case, since a connection state of the integrated antenna 3 is determined by detecting the drop voltage of the coil 6, it is preferable that the impedance of the coil 6 (resistance corresponding to the frequency of the current) is large so that a large drop voltage is obtained. However, when a large current flows through the coil 6, since the coil 6 is heated according to the power consumption, the device is constructed to use the coil 6 having small impedance but allow a large current to flow through it when a connection state of the integrated antennal 3 is detected.

Specifically, in order that a large current flows through the coil 6 when a connection state of the integrated antennal 3 is detected, the device transmits a pseudo up-link signal (64 kbps) from the VICS (light) processing circuit 17 to the transmitting element 26, and in the timing, detects the drop voltage of the coil 6 generated by current (alternating current) that flows through the transmitting element 26.

The coil 6 having the following property may be used taking its possible burning into account. Specifically, because of the property of the coil 6, when a pseudo up-link signal is transmitted to the transmitting element 26 of the integrated antenna 3, power consumption of the coil 6 does not exceed the rated power consumption of the coil 6 (power consumption when an AC signal (64 kbps) is energized). The reason is that the device, when detecting a connection state of the integrated antennal 3 by the antenna detection circuit 10, detects the drop voltage of the coil 6 when transmitting the pseudo up-link signal (radio frequency signal) to the transmitting element 26 of the integrated antenna 3. With this, even if a large current corresponding to the pseudo up-link signal flows through the coil 6, the burning of the coil 6 can be prevented.

In the above embodiment, when power is applied to the vehicle navigation device 1, since the power is fed from the power supply line 5 of the circuit section 2 to the power supply line 20 of the integrated antenna 3 through the coil 6, the non-inductive resistor 7, the coaxial cable 4, the non-inductive resistor 18, and the coil 19, the amplifiers 21 and 22 become operable.

The VICS (light) processing circuit 17 determines a connection state of the integrated antenna 3 when power is applied, or at every specific time.

Figure 2:
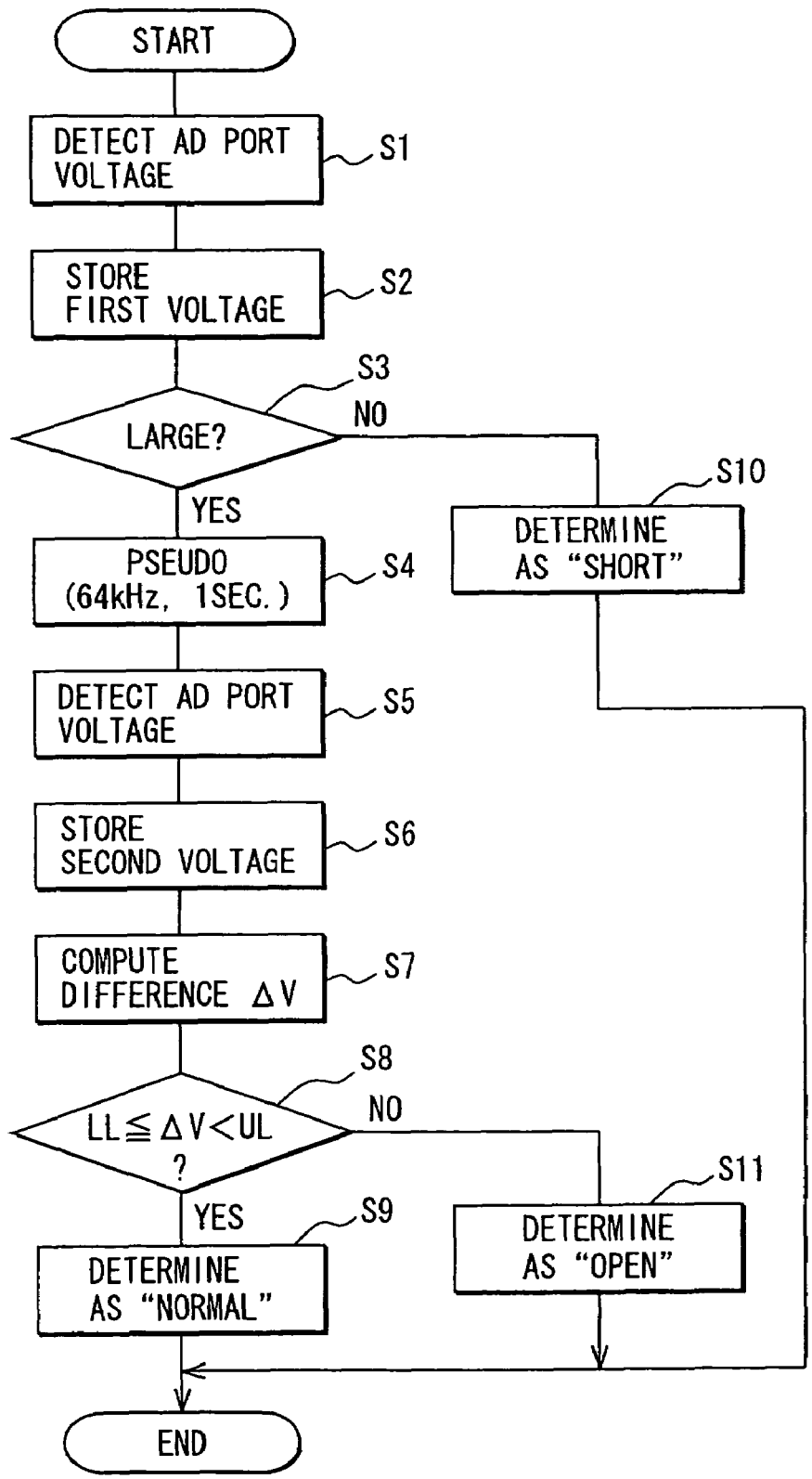
FIG. 2 is a flowchart showing the operation of an antenna detection circuit.

As shown in FIG. 2, the antenna detection circuit 10, for example, at power on or in predetermined connection confirmation timing, detects the voltage of the AD port (step S1), and stores it as a first voltage value (S2).

When the internal circuit of the integrated antenna 3 is normal, even when the amplifiers 21 and 22 are amplifying signals, since the current consumption is small, the power consumption of the integrated antenna 3 is small, and the drop voltage of the coil 6 is small. However, when the internal circuit of the integrated antenna 3 shorts due to failure, since a larger current greater than usual flows into the integrated antenna 3 through the coaxial cable 4 from the power supply line 5 of the circuit section 2, a large drop voltage occurs due to the impedance (resistance when a direct current flows) of the coil 6. In this case, the drop voltage of the coil 6 becomes larger when the current flowing through the coil 6 is larger. As a result, a divided voltage applied to the antenna detection circuit 10 becomes lower.

Accordingly, when the detected first voltage value is less than a predetermined value (S3: NO), the antenna detection circuit 10 determines that the integrated antenna 3 shorts internally (S10).

On the other hand, when the detected first voltage value is equal to or greater than the predetermined value (S3: YES), the antenna detection circuit 10 determines that the integrated antenna 3 does not short, and to perform next inspection, actuates the VICS (light) processing circuit 17 and outputs the pseudo up-link signal to the integrated antenna 3 (S4). The pseudo up-link signal is the same 64-kbps signal as normal up-link signals, and is outputted continuously for one second.

Since the other end of the coaxial cable 4 is connected to the power supply line 20 via the coil 19, and connected to the transistor 28 via the capacitor 30, the pseudo up-link signal outputted to the integrated antenna 3 is outputted to the transistor 28 without influencing the power supply line 20 of the integrated antenna 3.

When the transistor 28 performs switching at 64 kbps according to the pseudo up-link signal, a current flows into the transmitting element 26, and the pseudo up-link signal is outputted as an optical signal. With this, a large current corresponding to the pseudo up-link signal flows through the coil 6 provided in the circuit section 2.

When the large current corresponding to the pseudo up-link signal flows through the coil 6, since the current is an alternating current (AC current), a voltage drop occurs in the coil 6. This drop voltage of the coil 6 occurs due to impedance when the pseudo up-link signal of 64 kbps flows through the coil 6. As a result, the voltage detected by the VICS (light) processing circuit 17 falls.

The VICS (light) processing circuit 17 detects the voltage of the AD port in the timing in which a pseudo up-link signal is outputted (S5), stores it as a second voltage value (S6), then subtracts the second voltage value from the first voltage value stored as described above (S7).

When the internal circuit of the integrated antenna 3 is open due to, e.g., a break, outputting the pseudo up-link signal would not cause a change in current in the integrated antenna 3. When the internal circuit of the integrated antenna 3 fails, outputting the pseudo up-link signal may allow an abnormally large current to flow.

Accordingly, when a voltage difference between the first voltage value and the second voltage value is smaller than a predetermined lower limit, or equal to or greater than a predetermined upper limit (S8: NO), the antenna detection circuit 10 determines that the integrated antenna 3 is open (abnormal state) (S11).

On the other hand, when the value obtained by subtracting the second voltage value from the first voltage value is equal to or greater than a predetermined lower limit (value corresponding to an open state) and equal to or lower than an upper limit (value corresponding to an abnormal current) (S8: YES), the antenna detection circuit 10 determines that the integrated antenna is normal (S9).

As described above, the antenna detection circuit 10 can determine that the integrated antenna 3 shorts, is open or normal.

As described above, in the case of monitoring a connection state of the integrated antenna 3, constantly outputting the pseudo up-link signal to the integrated antenna 3 could disable the original application of the integrated antenna 3 and reduce the life of the transmitting element 26. Accordingly, in this embodiment, instead of constantly sending the pseudo signal to the integrated antenna 3 to confirm a connection state, when determining that the integrated antenna 3 is connected, the antenna detection circuit 10 lengthens a confirmation interval from several minutes to several tens of minutes. When determining that the integrated antenna 3 is not connected, shortens a confirmation interval to confirm a connection state as many times as possible because the above problem does not occur in this case.

Figure 3:
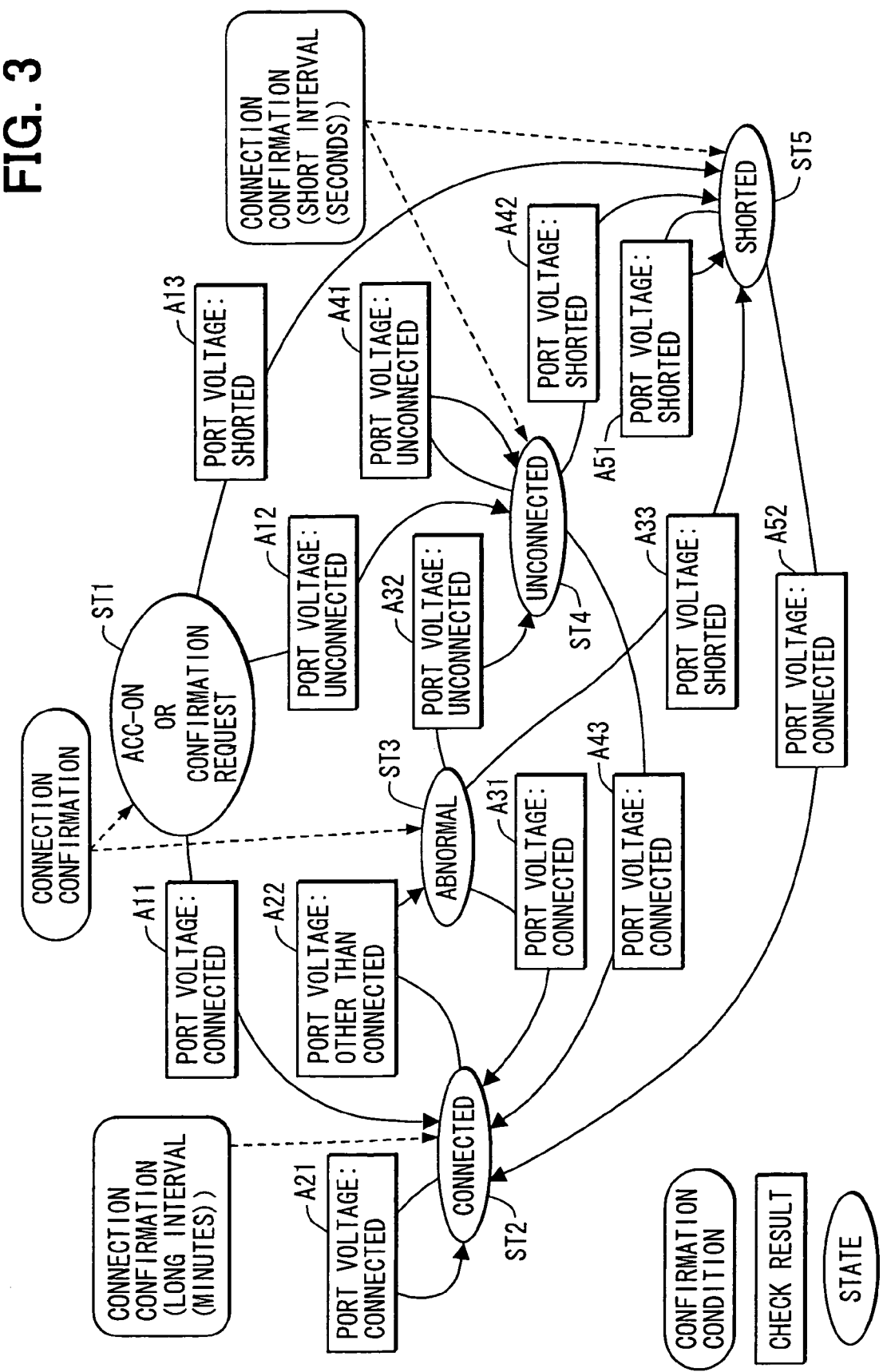
FIG. 3 is a schematic diagram showing the state transition of connection confirmation.

FIG. 3 shows state transition by such a determination. In this figure, when the ACC (vehicle accessory power switch) is on, or when a system check request from the user or a confirmation request from other software is made (ST1), the antenna detection circuit 10 confirms a connection state of the integrated antenna 3 based on a voltage value of the AD port as a port for connection confirmation. In this case, when a voltage value of the AD port indicates a connected state of the integrated antenna 3 (A11), the antenna detection circuit 10 shifts to a connected state (ST2). In the connected state (ST2), it confirms connection of the integrated antenna 3 based on the voltage of the AD port in a long interval (e.g., from several minutes to several tens of minutes, which may be a first predetermined interval).

When a voltage value of the AD port changes from an indication of a connected state (A21) to an indication of other states (A22), the antenna detection circuit 10 shifts to an abnormal connection state (ST3). In the abnormal connection state (ST3), it confirms connection of the integrated antenna 3 based on the voltage value of the AD port. When the voltage value of the AD port indicates a connected state (A31), the antenna detection circuit 10 returns to the connected state (ST2). When the voltage value of the AD port indicates an unconnected state (A32), the antenna detection circuit 10 shifts to an unconnected state. When the voltage value of the AD port indicates a short state (A33), the antenna detection circuit 10 shifts to a short state (ST5).

In the unconnected state (ST4) or the short state, the antenna detection circuit 10 confirms connection of the integrated antenna 3 based on the voltage of the AD port in a short interval (from several seconds to several tens of seconds, which may be a second predetermined interval). According to the connection result, the antenna detection circuit 10 shifts to the connected state (ST2), the unconnected state (ST4), or the short state (ST5), and correspondingly to the state, changes monitoring intervals as described above.

On the other hand, when the voltage value of the AD port indicates the unconnected state in the status ST1 state (A12), the antenna detection circuit 10 shifts to the unconnected state (ST4). When it indicates the short state (A13), the antenna detection circuit 10 shifts to the short state (ST5) to confirm connection in the short interval (from several seconds to several tens of seconds).

By the above-described operation, when the voltage value of the AD port indicates the unconnected state, connection confirmation is performed in the long interval. When it indicates the short state, connection confirmation is performed in the short interval.

According to this embodiment, in a construction with which a connection state of the integrated antenna 3 incorporating the transmitting element 26 and the receiving element 27 is detected, when the drop voltage of the coil 6 generated by current flowing into the integrated antenna 3 is detected, a connection state of the integrated antenna 3 is detected based on the drop voltage of the coil 6 when the pseudo up-link signal is outputted to the transmitting element 26. Accordingly, the drop voltage of the coil 6 can be detected in a state in which a relatively large current flows through the coil 6. Therefore, unlike conventional methods by which a connection state of an integrated antenna is detected by a drop voltage generated by current of a low-noise amplifier of the integrated antenna, the connection state of an integrated antenna can be correctly detected.

In addition, the coil 6 is used which has the property that the power consumption of the coil 6 when the pseudo up-link signal is outputted to the transmitting element 26 is smaller than rated power consumption corresponding to the conduction state of the pseudo up-link signal. Therefore, while the drop voltage of the coil 6 is accurately detected by the antenna detection circuit 10, the coil 6 can be prevented without fail from being burned out by reducing the power consumption of the coil 6 during detection.

Unlike conventional methods by which a connection state of the integrated antenna 3 is detected by the current flowing through the low-noise amplifier, the transmitting/receiving elements 26 and 27 for optical beacons can be provided in the integrated antenna 3, with effective prevention of noise invasion during their operation.

Furthermore, when it is determined that the integrated antenna 3 is connected, the connection state is confirmed in the long interval. When it is determined that the integrated antenna 3 is not connected, the connection state is confirmed in the short interval. As a result, the integrated antenna 3 can be used for its original application, and reduction in the life of the transmitting element 26 can be prevented.

Figure 4:
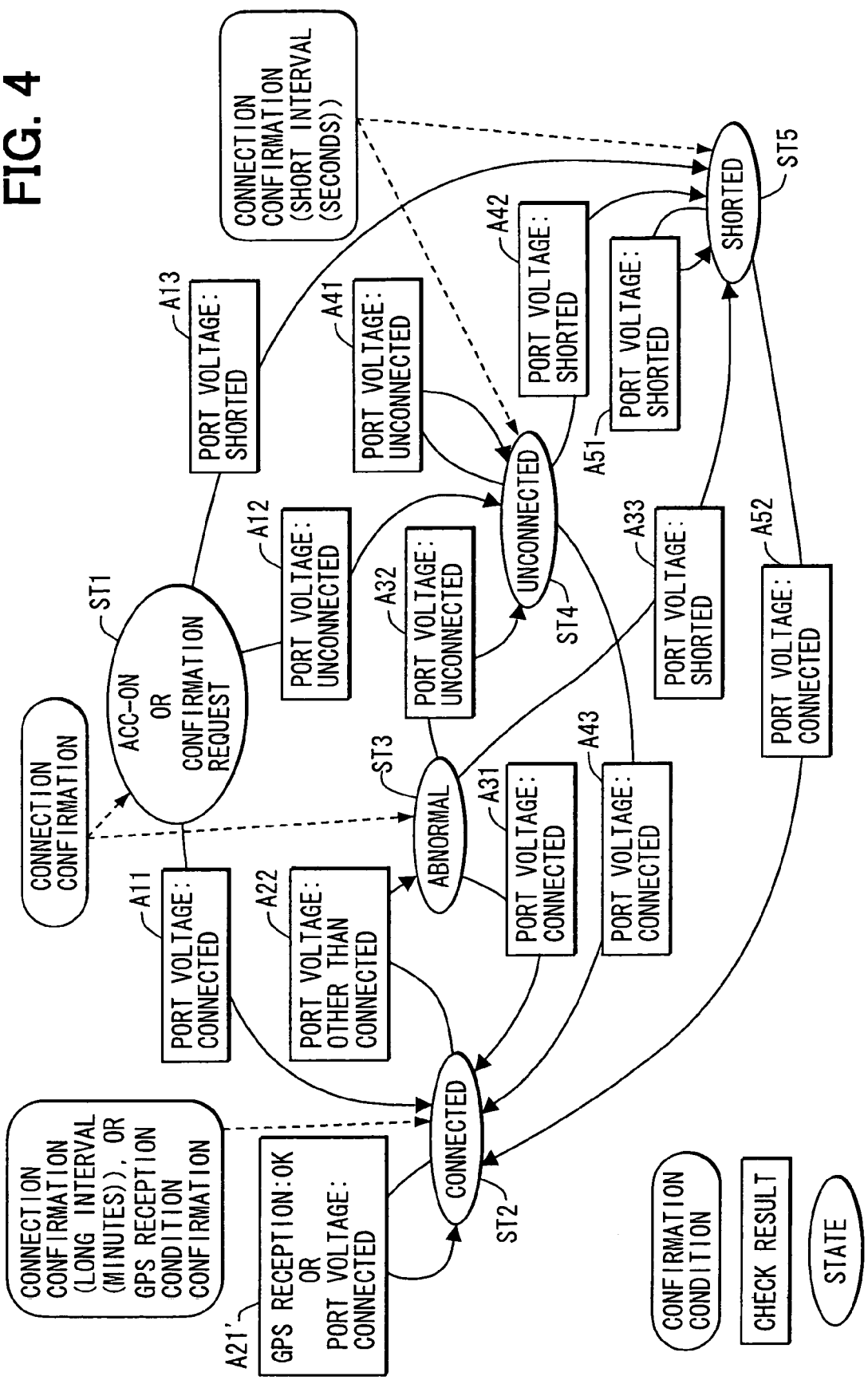
FIG. 4 is a schematic diagram showing a variant of the first embodiment.
Figure 5:
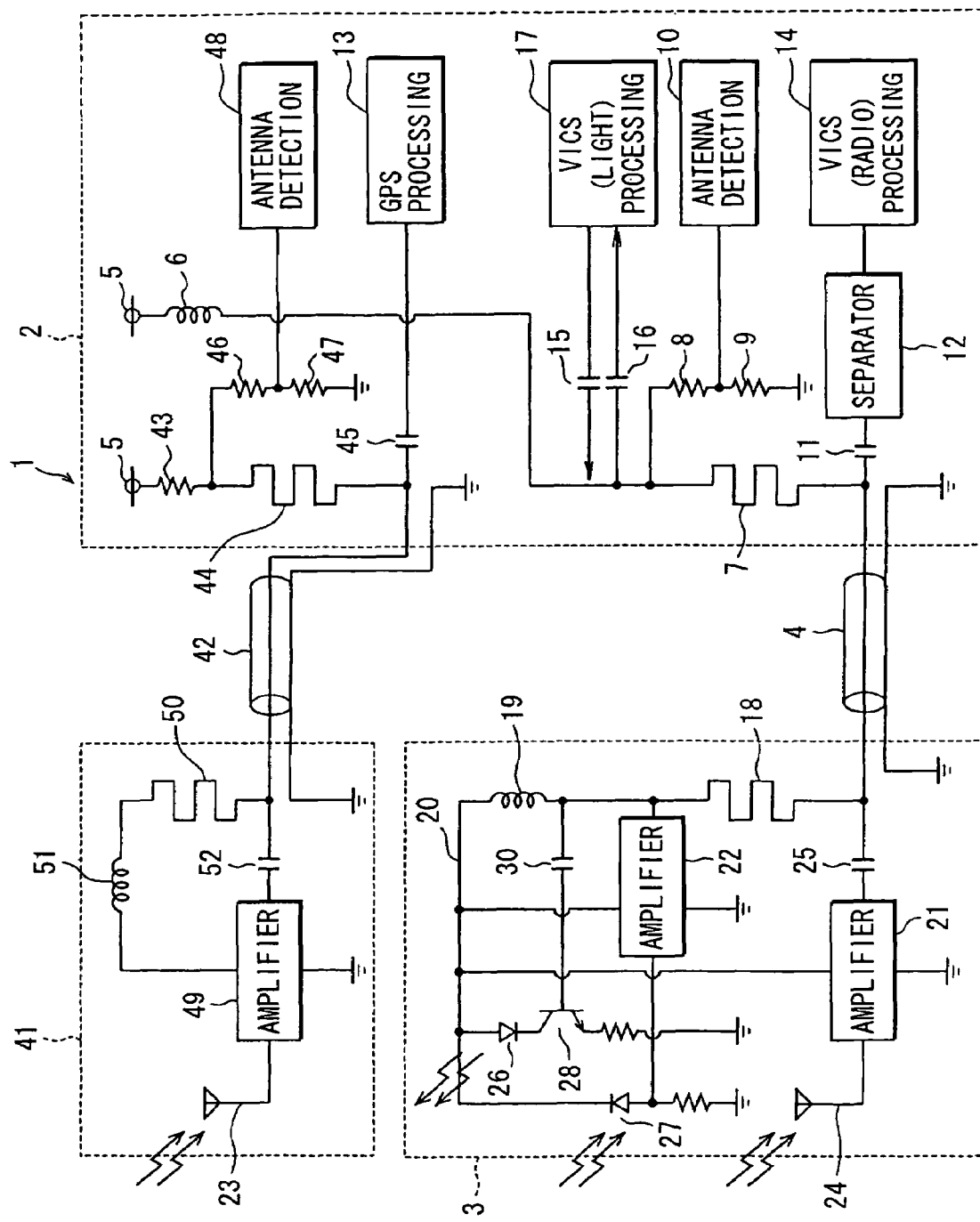
FIG. 5 is an electrical circuit diagram showing a second embodiment of the vehicle navigation device.

When a connection state of the integrated antenna 3 into which the GPS antenna 23 is integrated is confirmed, if a connected state of the integrated antenna 3 is confirmed, a reception state of GPS is checked as shown in FIG. 4. When the reception of radio waves from GPS satellites has been disabled, connection confirmation is made again determining that the integrated antenna 3 has been disconnected (A21').

However, since radio waves from the GPS satellites are very weak, an inaccurate determination may be made for some reasons. Therefore, it is not preferable to determine the connected state (ST2) shown in FIG. 4 based on GPS reception states in the unconnected state (ST4).

Second Embodiment

In a second embodiment, the GPS antenna 23 is separated from the integrated antenna 3. The integrated antenna 3 is constructionally identical with the integrated antenna 3 described in the first embodiment, except that the GPS antenna 23 is provided separately.

To the circuit section 2 of the vehicle navigation device 1, the integrated antenna 3 of VICS (radio/light) is connected, and a GPS receiving device 41 having the antenna 23 is connected via a coaxial cable 42.

A resistor 43 and a non-inductive resistor 44 are connected in series between the power supply line 5 of the circuit section 2 and one end of the coaxial cable 42. The GPS signal processing circuit 13 is connected via a capacitor 45 to a common junction of the non-inductive resistor 44 and the coaxial cable 42. The GPS signal processing circuit 13 processes GPS signals inputted from the GPS receiving device 41 via the capacitor 45.

Resistors 46 and 47 are connected in series between a common junction of the resistor 43 and the non-inductive resistor 44, and the 0V line. An antenna detection circuit is connected to a common junction of the resistors 46 and 47. The GPS receiving device 44 mainly comprises the GPS antenna 23 and an amplifier 49. The amplifier 49 is connected to the other end of the coaxial cable 42 via the non-inductive resistor 50 and a coil 51 so that power is fed to the amplifier 49 via the coaxial cable 42 from the circuit section 2. The amplifier 49 amplifies a received signal from the GPS antenna 23, and outputs it to the circuit section 2 via a capacitor 52 and the coaxial cable 42.

The VICS (light) processing circuit 17 of the circuit section 2 periodically outputs the pseudo up-link signal when the VICS signal is not received. The antenna detection circuit 10 detects the drop voltage by the coil 6 in the timing of outputting the pseudo up-link signal from the VICS (light) processing circuit 17. Accordingly, when a connection with the integrated antenna 3 becomes unstable, or when the integrated antenna 3 fails, since the drop voltage value detected by the antenna detection circuit 10 becomes abnormal, the vehicle navigation device 1 notifies the user that the integrated antenna 3 malfunctions.

On the other hand, the antenna detection circuit 48 corresponding to the GPS receiving device 41 always detects the drop voltage by the resistor 43. Accordingly, when a connection with the GPS receiving device 41 becomes unstable, or when the GPS receiving device 41 fails, since the drop voltage value detected by the antenna detection circuit 48 becomes abnormal, the vehicle navigation device 1 notifies the user that the GPS receiving device 41 malfunctions.

According to this embodiment, the GPS antenna 23 is separated from the integrated antenna 3 to form the GPS receiving device 41 having the GPS antenna 23, and a connection state of the GPS receiving device 41 is always monitored. By this construction, in comparison with the first embodiment in which, when the GPS antenna 23 fails, a failure in the GPS antenna 23 can be detected only in the timing of outputting the pseudo up-link signal, the failure in the GPS antenna 23 GPS can be detected earlier.

Third Embodiment

The third embodiment uses electromagnetic induction as a method for detecting a voltage drop of a coil by an antenna detection circuit.

Figure 6:
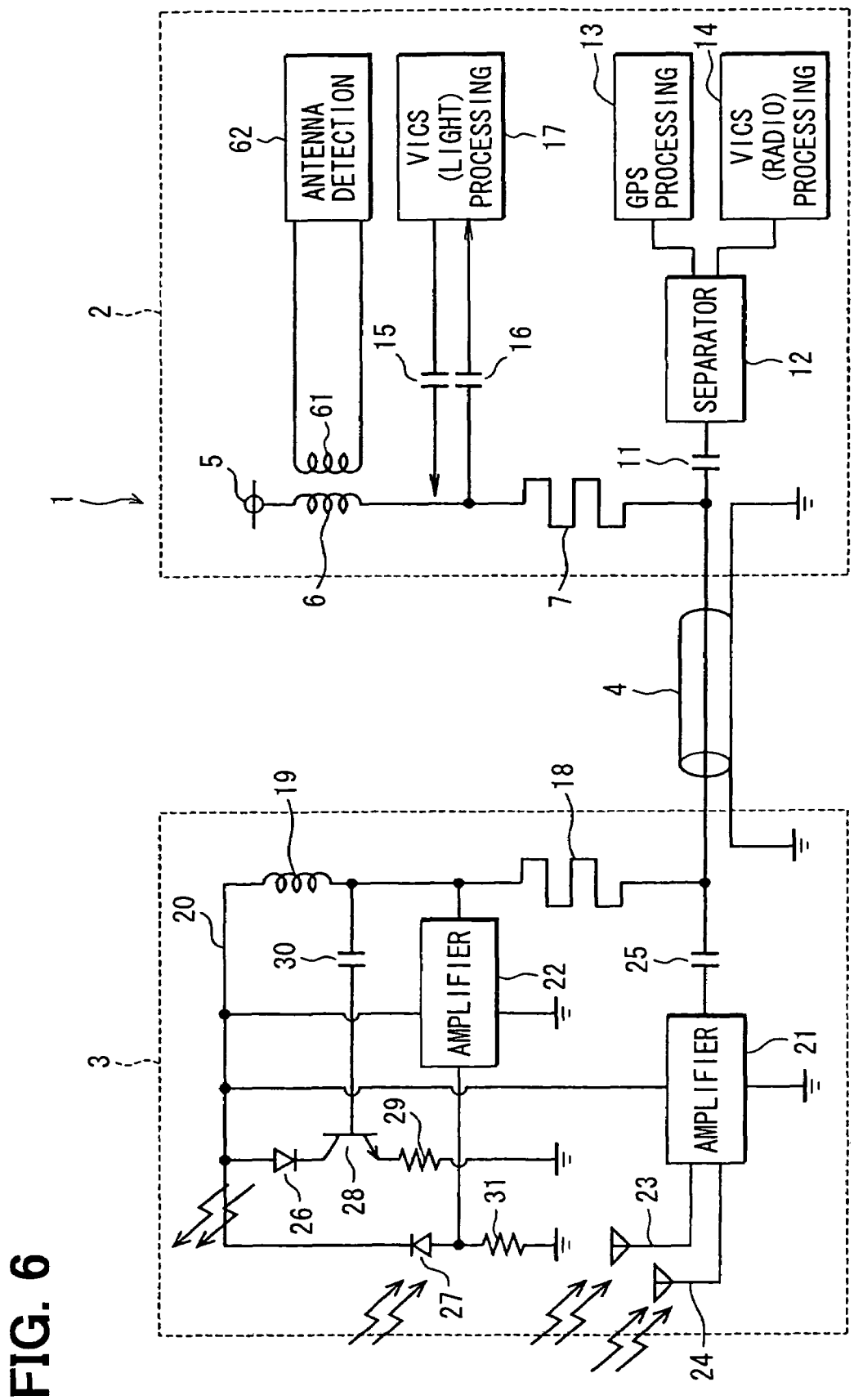
FIG. 6 is an electrical circuit diagram showing a third embodiment of the vehicle navigation device.

In FIG. 6, the circuit section 2 of the vehicle navigation device 1 is provided with a detection coil 61 for generating a voltage output correspondingly to the drop voltage in the coil 6. The detection coil 61 is disposed to be capable of being electromagnetically coupled with the coil 6, and generates counter-electromotive force by electromagnetic induction according to the current flowing through the coil 6. An antenna detection circuit 62 monitors the electromotive force of the detection coil 61 in the timing in which the pseudo up-link signal is transmitted from the VICS (light) processing circuit 17 to the transmitting element 26.

When the integrated antenna 3 is connected, as the pseudo up-link signal (radio frequency signal) is transmitted to the integrated antenna 3, current (high-frequency current) flows through the integrated antenna 3. Accordingly, since the current (high-frequency current) flows through the coil 6, electromotive force having a magnitude of a prescribed level is generated in the detection coil 61. As a result, the antenna detection circuit 62 can detect that the integrated antenna 3 is connected, from the generation of electromotive force in the detection coil 61. On the other hand, when the integrated antenna 3 is not connected, since no electromotive force is generated in the detection coil 61 even in the timing in which the pseudo up-link signal is transmitted, the antenna detection circuit 62 can detect that the integrated antenna 3 is not connected.

According to this embodiment, a connection state of the integrated antenna 3 is detected based on whether electromotive force is generated in the detection coil 61 in the timing in which the pseudo up-link signal (radio frequency signal) is transmitted to the integrated antenna 3. Accordingly, the antenna detection circuit 62 can be formed electrically independently of an electrical circuit for feeding power to the integrated antenna 3 or transmitting signals.

The present invention is not limited to the above embodiments and may be modified as follows.

Although, in the above embodiments, the integrated antenna 3 is constructed to allow power and transmitting/receiving signals to be superimposed in one coaxial cable 4, the integrated antenna 3 may be constructed to use different cables for power and signal transmission/reception. Amplifiers for GPS signals and VICS signals may be provided individually.

During detection of a connection state of the integrated antenna 3, instead of outputting the pseudo 64-kbps up-link signal to the integrated antenna 3, an inspection signal or DC signal having different frequencies may be outputted. In this case, when current flowing through the transmitting element 26 is a direct current, a resistor may be provided as a resistor circuit.

Various functions of the processing circuits 10, 13, 14, 17, 48, 62 may be performed by a microcomputer, which is programmed to attain the same functions.

What is claimed is:

1. A device for detecting a connection state of an integrated antenna having an antenna for communicating with an outside of a vehicle, and a transmitting/receiving element for optical beacons by detecting a current flowing through the integrated antenna, the device comprising:

a resistor means through which the current flows into the integrated antenna by feeding power to the integrated antenna;

a voltage outputting means that outputs a voltage corresponding to a drop voltage in the resistor means;

an inspection signal outputting means that outputs an inspection signal to the transmitting element; and a connection state detecting means that detects a connection state of the integrated antenna based on a voltage from the voltage outputting means when the inspection signal outputting means is operating, wherein a resistance value of the resistor means is set to a resistance value with which the resistor means can obtain a predetermined drop voltage when current flows through the resistor means as the inspection signal flows through the transmitting element.

2. The device according to claim 1,
wherein the resistance value of the resistor means is set to a resistance value with which power consumption of the resistor means is less than rated power consumption when the current flows through the resistor means as the inspection signal flows through the transmitting element.

3. The device according to claim 1,
wherein the inspection signal is a pseudo optical beacon up-link signal, and
wherein the resistor means includes a coil.

4. The device according to claim 1,
wherein the connection state detecting means confirms a connection state in a first predetermined interval on detecting that the integrated antenna is connected, and confirms a connection state in a second predetermined interval shorter than the first predetermined interval on detecting an abnormal connection state.

5. The device according to claim 1, further comprising:
a GPS receiving means,
wherein the connection state detecting means determines that the integrated antenna is connected when the GPS receiving means is in a receiving-enabled state.

6. The device according to claim 1, further comprising:
a GPS receiver unit provided separately from the integrated antenna including a radio receiving element; and
a second set of a resistor means, a voltage outputting means, a connection state detecting means, which are similar to a set of the resistor means, the voltage outputting means and the connection state detecting means for the integrated antenna, is connected to the GPS receiver unit.

7. The device according to claim 1,
wherein the resistor means includes a coil and a resistor connected in series to each other, and is connected to the voltage outputting means.

8. The device according to claim 7,
wherein the voltage outputting means includes voltage dividing resistors connected in parallel to the resistor to output the drop voltage proportional to a drop voltage across the resistor.

9. The device according to claim 7,
wherein the voltage outputting means includes a detection coil electromagnetically coupled with the coil of the resistor means.

10. A vehicle navigation device including the device according to claim 1.

11. A device for detecting a connection state of an antenna including transmitting and receiving elements for optical communications with an outside of a vehicle by detecting a current flowing to the antenna, the device comprising:
a series circuit of a coil and a resistor connected to the antenna through a cable so that the current flows into the integrated antenna by feeding power of a power source to the integrated antenna through the cable;
an inspection signal circuit connected to the series circuit to output an inspection signal to the transmitting element through the series circuit and the cable; and
a connection detecting circuit connected to the series circuit to detect a connection state of the antenna based on a difference in voltages of the series circuit between cases before and after the inspection signal is output.

12. The device according to claim 11,
wherein the inspection signal is a pseudo optical beacon up-link signal applied to the transmitting element.

13. The device according to claim 11,
wherein the connection detecting circuit shortens an interval of the inspection signal when an abnormal connection state is detected.

* * * * *